Patented Jan. 23, 1951

2,539,238

UNITED STATES PATENT OFFICE 2,539,238

PROCESS FOR THE PRODUCTION OF MONOCHLOROACETIC ACID

Charles M. Eaker, Affton, Mo., assignor to Monsanto Chemical Company, St. Louis, Mo., a corporation of Delaware No Drawing. Application August 20, 1949, Serial No. 111,582

6 Claims. (Cl. 260—539)

This invention relates to monochloroacetic acid; more specifically this invention relates to an improved process for the production of monochloroacetic acid, which comprises the chlorination of a mixture containing certain definite proportions of acetic acid and acetic anhydride whereby said mixture is converted to substantially pure monochloroacetic acid.

Monochloroacetic acid is a valuable organic intermediate, being utilized as a basic reactant in many organic reactions. Pure monochloroacetic acid (alpha modification) crystallizes at about 63° C. In most industrial organic syntheses wherein monochloroacetic acid is utilized as one of the basic reactants, it is preferred that monochloroacetic acid be of such a degree of purity so as to have a crystallizing point greater than about 59° C. Various procedures for the preparation of monochloroacetic acid have been disclosed in the prior art that are capable of producing monochloroacetic acid having the required degree of purity. Typical of these various procedures are the hydrolysis of trichloroethylene in the presence of sulfuric acid, chlorination of ketene followed by hydrolysis, the reaction of formaldehyde, carbon monoxide and anhydrous HCl under pressure and at elevated temperature, and the direct chlorination of acetic acid in the presence of catalytic quantities of a suitable catalyst, such as phosphorus, sulfur, iodine, the oxides and chlorides of phosphors and sulfur, chloroacetaldehyde or acetic anhydride.

Of the above-mentioned procedures for the preparation of monochloroacetic acid, only one has become of interest from a commercial standpoint. The most widely used commercial process for the production of monochloroacetic acid is the chlorination of acetic acid in the presence of catalytic quantities, of the order of 5% or less by weight, of acetic anhydride. In this process, however, there exists two serious deficiencies, viz., exceedingly low conversion to monochloroacetic acid is obtained and extensive recovery and purification procedures are necessary in order to obtain monochloroacetic acid having a crystallizing point greater than 59° C.

In the chlorination of a mixture containing glacial acetic acid and catalytic quantities of acetic anhydride, of the order of 5% by weight or less, chlorination temperatures in excess of about 110° C. are required in order that the reaction proceed. Under such conditions significant quantities of polychloroacetic acids are formed unless chlorination is stopped when about 30–40% of the acetic acid has been converted to monochloroacetic acid. Therefore, in order that this process as heretofore used be practical commercially, it is necessary that the process be carried out on a continuous basis, constantly separating a monochloroacetic acid fraction and recycling the unchlorinated acetic acid to prevent the formation of excessive quantities of polychlorinated acetic acid. Furthermore, in the above described continuous process as heretofore utilized, the monochloroacetic acid fraction separated from the reaction mixture has a crystallizing point significantly less than 59° C. due to the presence of acetic acid and polychlorinated acetic acids. It is, therefore, necessary to remove the acetic acid by fractionation and then statically crystallize the remaining fraction in order to separate the monochloroacetic acid from the polychloroacetic acids contained therein in order to obtain monochloroacetic acid having a crystallizing point greater than 59° C. Obviously, this is a costly unit operation requiring extensive process equipment.

It is an object of this invention to provide an improved batch process for the production of monochloroacetic acid.

It is a further object of this invention to provide an improved batch process for the production of monochloroacetic acid by the chlorination of a mixture containing glacial acetic acid and acetic anhydride, in which process the mixture may be chlorinated until conversion to the monochloro stage has been substantially complete without the formation of significant quantities of polychloroacetic acids.

It is another object of this invention to provide an improved batch process for the production of monochloroacetic acid by the chlorination of a mixture containing glacial acetic acid and acetic anhydride, whereby the mixture is converted to a reaction product having a crystallizing point greater than 59° C. consisting of substantially pure monochloroacetic acid.

It is a still further object of this invention to provide an improved batch process for the production of monochloroacetic acid wherein the reaction mixture obtained from the reaction of 1 molecular proportion of chlorine and approximately a 1 molecular proportion of a mixture of glacial acetic acid and acetic anhydride, calculated as acetic acid, be used without further purification in various organic syntheses.

Other objects will become apparent from the discussion of the novel process of this invention and the claims.

As previously stated, when a mixture of glacial acetic acid and catalytic quantities of acetic anhydride, of the order of 5% by weight, is chlorinated with gaseous chlorine at the elevated temperatures required when chlorinating such a mixture, significant quantities of polychloroacetic acids are formed if the chlorination is carried much beyond the stage where 30-40% of the acetic acid in the mixture has been chlorinated to the mono derivative. In such a process if substantially molecular quantities of chlorine are introduced for each molecular quantity of acetic acid in the mixture, the resultant reaction product would contain monochloroacetic acid and exceedingly large quantities of polychloroacetic acids which would have to be purified by distillation and static crystallization in order to obtain substantially pure monochloroacetic acid. It has now been discovered, however, that if a mixture comprised of 15-75% glacial acetic acid and 85-25% acetic anhydride, i. e., a mixture containing at least about 25% acetic anhydride and not more than about 85% acetic anhydride, is chlorinated with gaseous chlorine at a temperature in the range of from about 70° C. to about 110° C., chlorination proceeds quite differently. It has been discovered that under such temperature conditions such a mixture of acetic anhydride and glacial acetic acid may be chlorinated directly and completely to the monochloroacetic acid stage without the formation of appreciable quantities of polychloroacetic acids. In such a process it has been found that the significant impurities that are formed during the chlorination procedure are not polychloroacetic acids but chloroacetyl chloride and/or chloroacetic anhydride. Both of these impurities formed in the novel chlorination procedure of this invention, when hydrolyzed, yield monochloroacetic acid and hydrogen chloride. Therefore, chlorinating a mixture containing from 15-75% glacial acetic acid and 85-25% acetic anhydride with an approximately 1 molecular proportion of chlorine for each 1 molecular proportion of the mixture calculated as acetic acid, yields a reaction product having a crystallizing point usually around 57° C. and containing predominantly monochloroacetic acid, small amounts of chloroacetyl chloride and chloroacetic anhydride and a very minor amount of polychloroacetic acids. Due to the nature of the chloroacetyl chloride and chloroacetic anhydride, this reaction product may then be treated with a sufficient quantity of water to hydrolyze these impurities, thereby converting these impurities to monochloroacetic acid. After such hydrolysis, and after removal of the hydrogen chloride formed during the hydrolysis, the reaction product then has a crystallizing point greater than 59° C. of substantially pure monochloroacetic acid. Thus, the novel process of this invention results in a reaction product which contains predominantly monochloroacetic acid and a minor amount of impurities. However, the impurities are of such a nature that they need not be removed in order to isolate pure monochloroacetic acid, but may be treated with water to convert them to monochloroacetic acid itself. Therefore, in the novel process of this invention substantially pure monochloroacetic acid is obtained by chlorinating a mixture containing from 15-75% glacial acetic acid and 85-25% acetic anhydride to the monochloroacetic acid stage to obtain a reaction product containing predominantly monochloroacetic acid, and thereafter adding water to the reaction product until the crystallizing point of the reaction product reaches a maximum of above about 59° C., after removal of the hydrogen chloride formed, at which point the reaction product is then substantially pure monochloroacetic acid.

Due to the fact that the reaction product obtained in the novel process of this invention contains, prior to hydrolysis, an impurity content comprised of chloroacetyl chloride and/or chloroacetic anhydride, both of which hydrolyze to monochloroacetic acid, and a quantity of polychloroacetic acids so insignificantly small that it need not be removed in order to obtain a monochloroacetic acid of a degree of purity suitable for use in subsequent industrial organic syntheses, the reaction product, prior to hydrolysis, may be used directly in various organic syntheses wherein substantially pure monochloroacetic acid is used as a reactant. Thus, in those organic syntheses which are carried out in an aqueous medium, the reaction product obtained in the novel process of this invention, may be used directly without first hydrolyzing the impurities to monochloroacetic acid, since such hydrolysis will take place in the aqueous medium in which the particular organic synthesis is carried out. Typical examples of such utility are the preparation of halogenated phenoxy acetic acids and cyanoacetic acids. In preparing halogenated phenoxy acetic acids, monochloroacetic acid is reacted with a halogenated phenol in an aqueous alkaline medium. In the preparation of cyanoacetic acid, an alkali metal cyanide is reacted with an alkali metal chloroacetate which had been formed by the neutralization of chloroacetic acid in an aqueous medium. Therefore, in both of these described syntheses, the reaction product obtained in the novel process of this invention, prior to hydrolysis, may be utilized since the significant impurities in the reaction product will hydrolyze to monochloroacetic acid during the described syntheses, which are carried out in an aqueous medium.

In addition to having utility in those organic syntheses carried out in an aqueous medium, the reaction product prior to hydrolysis may also be utilized in esterification reactions, such as the preparation of alkyl chloroacetate by the reaction of an alkyl alcohol and chloroacetic acid. Inasmuch as both chloroacetyl chloride and chloroacetic anhydride will react with an alkyl alcohol to form an alkyl chloroacetate, neither of these impurities need first be hydrolyzed to chloroacetic acid before carrying out the esterification reaction.

In carrying out the novel process of this invention, the mixture of glacial acetic acid and acetic anhydride to be chlorinated must be of the previously prescribed composition, e. g., about 15-75% glacial acetic acid and about 85-25% acetic anhydride. If the quantity of acetic anhydride in the composition is greater than 85% or less than 25%, the chlorinated reaction product will contain excessive quantities of impurities which can not be hydrolyzed to form monochloroacetic acid.

During chlorination, the reaction temperature is maintained in the range of from about 70° C. to about 110° C. If the temperature is allowed to fall much below 70° C., the rate of reaction is significantly retarded and the reaction mass may crystallize. Temperatures in excess of about 110° C. promote the formation of polychloroacetic acids. While the chlorination may be carried out anywhere within the prescribed temperature range, it has been found expedient to maintain the temperature nearer the upper limit, around 95° C. to 110° C. in the initial stages of the reaction as the reaction begins more quickly at such a temperature. After the reaction has started, the temperature may then be varied or maintained anywhere within the prescribed temperature range, that is in the range of about 70°–110° C.

According to the novel process of this invention, the mixture of acetic acid and acetic anhydride is chlorinated with gaseous chlorine until the monochloro stage is reached or, in other words, until an approximately one molecular proportion of chlorine has been utilized for each molecular proportion of the mixture of acetic acid and acetic anhydride, calculated as acetic acid with each molecular proportion of acetic anhydride being equivalent to two molecular proportions of acetic acid. While theoretically the reaction should proceed on a mol for mol basis, it has been found to be practical to utilize a slight excess of chlorine, of the order of 5–10%, over the required amount. Molecular quantities may be utilized but necessarily result in a more impure product due to the presence of unreacted acetic acid in the final reaction product. Greater excesses of chlorine may be utilized, but such a practice increases the cost of the final product. Greater excesses of chlorine do not significantly affect the quality of the final product, as chlorinating the prescribed mixture in the prescribed temperature range is not conducive to the formation of polychloroacetic acids. Hence, excess chlorine merely passes through the mixture.

Inasmuch as one mol of hydrogen chloride gas is formed for each mol of monochloroacetic acid prepared, means should be provided for the efficient removal of this gas. This hydrogen chloride may be merely vented to the atmosphere or, if desired, absorbed in a suitable absorber, such as water or an alkaline solution. The chlorinator wherein the reaction is carried out should be equipped with an adequate condenser to prevent loss of the reactants or the desired reaction products during the chlorination process.

After the mixture of glacial acetic acid and acetic anhydride is chlorinated up to the monochloroacetic acid stage, that is, one atom of chlorine being introduced into each molecule of acetic acid, further introduction of chlorine into the mixture is stopped. The reaction product thus obtained may be utilized as such in subsequent industrial organic syntheses as heretofore described, or may be treated with a water to hydrolyze the chloroacetyl chloride and/or chloroacetic anhydride contained therein to monochloroacetic acid, thereby obtaining a reaction product having a crystallizing point of 59° C. after removal of the hydrogen chloride formed during the hydrolysis. Due to the nature of the reaction, the quantites of chloroacetyl chloride and/or chloroacetic anhydride formed during the chlorination process, vary slightly from batch to batch. Consequently, it is not possible to specify the exact proportion of water to be added to the reaction product in order to completely hydrolyze these impurities. The quantity of water required will necessarily vary slightly from batch to batch, but generally it is of the order of from 1 to 3% by weight of the reaction product. Practically, however, the quantity of water added is that quantity of water which will hydrolyze all of the hydrolyzable impurities contained in the reaction product, and result in a reaction product having a maximum crystallizing point in excess of about 59° C. after removal of the hydrogen chloride formed during the hydrolysis. Inasmuch as 1 molecular proportion of hydrogen chloride will be formed for each molecular proportion of chloroacetyl chloride hydrolyzed, it is necessary to remove this hydrogen chloride if a reaction product having a crystallizing point in excess of 59° C. is desired. If the hydrogen chloride is not removed, it will depress the crystallizing point of the reaction product in much the same manner as do chloroacetyl chloride and chloroacetic anhydride. In carrying out this hydrolysis reaction, the water may be added in small increments, determining the crystallizing point of the reaction product after the addition of each increment and removal of the hydrogen chloride formed during the hydrolysis, and stopping the addition of water when the crystallizing point of the reaction product has reached a maximum in excess of about 59° C. A more convenient method for determining the amount of water to be added to the reaction product in order to raise the crystallizing point of the reaction product to a maximum in excess of about 59° C., is to withdraw from the reaction product a small weighed laboratory size sample and determine the quantity of water necessary to raise the crystallizing point of this small weighed sample to a maximum in excess of 59° C. From this result, the total quantity of water necessary to hydrolyze all of the hydrolyzable impurities in the entire batch of the reaction product, may be calculated. The actual hydrolysis is carried out by mixing the water with the reaction product, at a temperature in excess of the melting point of the reaction product, that is, in excess of about 60° C., and preferably in the range of from about 60° C. to about 150° C. Higher temperatures may be utilized, but offer no significant advantage. The hydrogen chloride may be removed from the reaction product by any convenient method well known to those skilled in the art. For example, the evolution of hydrogen chloride may be permitted to proceed naturally, aided only by agitation of the reaction product or the reaction product may be placed under reduced pressure to facilitate the removal. Although the crystallizing point of the reaction product, indicative of its purity, is determined on a substantially hydrogen chloride free sample, all of the hydrogen chloride need not be removed from the reaction product at this stage. If the monochloroacetic acid thus prepared is to be utilized in a reaction wherein free hydrogen chloride will have no deleterious effect, complete removal of the hydrogen chloride need not be accomplished at this stage.

The novel features of the chlorination process of this invention will be made more evident from the following illustrative examples.

*Example I*

In this and subsequent examples, the apparatus utilized in carrying out the chlorination procedures described, consisted of a glass chlorinator equipped wih an efficient agitator, a thermometer, chlorine injection tube and an efficient brine or water cooled condenser. Provision was also made for the absorption of the hydrogen chloride gas which formed during the reaction and passed out of the reaction vessel into the condenser.

542 g. of glacial acetic acid and 28 g. of acetic anhydride, thereby resulting in a mixture containing 5% acetic anhydride and 95% glacial acetic acid, were charged to the chlorinator and with constant agitation heated to a temperature of about 95° C. When this temperature had been reached, gaseous chlorine was introduced into the reaction mixture at the rate of 40 g. per hour. Initially, substantially complete chlorine absorption was obtained as evidenced by the off-gas analysis showing substantially 100% hydrogen chloride and negligible quantities of free chlorine. However, when approximately 30% conversion to the monochloro stage had been reached, chlorine efficiency significantly dropped as shown by exceptionally large quantites of free chlorine in the off-gas. In order to obtain complete efficient chlorine absorption, the rate of the addition of chlorine had to be lowered to about 10 g. per hour. After the reaction had started, the temperature was maintained within the range of about 70° C. to about 110° C. Cooling water on brine was circulated through the condenser to prevent any loss. Chlorine addition was continued until approximately 1.05 mols of chlorine had been added for each 1 mol of glacial acetic acid and acetic anhydride, calculated as acetic acid. At this point, chlorine addition was stopped and the reaction mixture allowed to cool.

The reaction mixture thus obtained contained considerable quantites of acetic acid and polychlorinated acetic acid, as evidenced by analysis and by the fact that the crystallizing point of the reaction product could not be raised above 45° C. during the addition of water and subsequent removal of hydrogen chloride formed during the hydrolysis. A total of 658 g. of reaction product was obtained containing about 73% monochloroacetic acid and a considerable quantity of polychloroacetic acids and acetic acid from which there could be obtained about a 50% yield of monochloroacetic acid based on the acetic acid and acetic anhydride charged, calculated as acetic acid.

The reaction product had no utility, per se, and in order to obtain substantially pure monochloroacetic acid from this reaction mixture, purification by fractionation and static crystallization was necessary in order to separate the monochloroacetic acid from the appreciable quantities of polychloroacetic acids contained therein.

Example II

Utilizing the equipment and procedure as described in Example I, a mixture of 485 g. of glacial acetic acid and 85 g. of acetic anhydride, the mixture thereby containing 15% acetic anhydride and 85% glacial acetic acid, was chlorinated. The reaction mixture weighed 807 g. and contained about 80% monochloroacetic acid and from which there could be obtained a yield of about 70% monochloroacetic acid. While this reaction mixture contained less polychloroacetic acids than did the reaction mixture obtained in Example I, substantially pure monochloroacetic acid could be obtained from this reaction mixture only by static crystallization. Attempted hydrolysis of the impurities with water permitted raising the crystallizing point of the reaction product to a maximum of 49° C.—considerably lower than the minimum crystallizing point of 59° C. required to permit utilization of the monochloroacetic acid in organic synthesis.

Example III

A mixture containing 456 g. of glacial acetic acid and 114 g. of acetic anhydride, thereby resulting in a mixture containing 20% acetic anhydride and 80% glacial acetic acid, was chlorinated according to the method described in Example I. The reaction product weighed 820 g. and contained about 90% monochloroacetic acid and from which there could be obtained a yield of about 79% monochloroacetic acid. After hydrolysis of the chloroacetyl chloride and the chloroacetic acid contained therein as impurities and removal of the hydrogen chloride formed during hydrolysis, the crystallizing point of the reaction product was 56.5° C. While this reaction product contained smaller quantities of polychloroacetic acids than did the reaction products obtained in Examples I and II, it still was not a sufficient degree of purity to permit utility without further purification. Hence, purification of this reaction product by static crystallization was necessary in order to obtain substantially pure monochloracetic acid having a crystallizing point in excess of 59° C.

Example IV

A charge of 427 g. of glacial acetic acid and 143 g. of acetic anhydride was placed in the chlorinator as described in Example I. This quantity of reactants resulted in a mixture containing 25% acetic anhydride and 75% glacial acetic acid. The agitator was started and the mixture heated. When the temperature reached 95° C., the introduction of gaseous chlorine into the mixture was begun. Chlorine was added at a rate of about 40 g. per hour, which rate of addition was continued throughout the entire chlorination period during which time substantially complete absorption took place with negligible loss of chlorine in the off gas. After the reaction had started, the temperature was maintained within the range of from about 70° C. to about 110° C. The hydrogen chloride off gas was absorbed in a suitable alkaline absorber. After approximately 1.1 mols of chlorine had been introduced for each 1 mol of glacial acetic acid and acetic anhydride, calculated as acetic acid, appreciable quantities of free chlorine began to appear in the off gas. The reaction was stopped and the reaction mixture allowed to cool.

The reaction product thus obtained weighed 850 g. and had a crystallizing point, as is, of about 57° C., indicating a very low impurity content.

To the reaction product thus obtained was added approximately 1.5% by weight of water, and the mixture stirred while heating to a temperature of about 100° C. and removing the hydrogen chloride gas formed. After the reaction was complete, the reaction product thus obtained had a crystallizing point of 59.8° C., thereby indicating its composition to be substantially pure monochloroacetic acid of a sufficient degree of purity to permit utilization in organic syntheses without further purification.

In view of the composition of the reaction product thus obtained after hydrolysis, the reaction product prior to hydrolysis could be utilized in subsequent organic syntheses carried out in an aqueous medium, as under such conditions hydrolysis of the significant impurities contained therein, viz., chloroacetyl chloride and chloroacetic anhydride, would take place during the subsequent organic syntheses.

Example V 170 g. of acetic anhydride and 400 g. of glacial acetic acid were charged to the chlorinator described in Example I. This mixture was comprised of 30% acetic anhydride and 70% glacial acetic acid. With constant agitation this mixture was then chlorinated in accordance with the method described in Example IV. Chlorinating to the monochloro stage yielded a reaction product weighing 862 g., having a crystallizing point of about 57° C.

To the reaction product thus obtained was added a small amount of water to hydrolyze the chloroacetyl chloride and the chloroacetic anhydride contained therein to monochloroacetic acid, in accordance with the procedure described in Example IV. The reaction product thus obtained had a crystallizing point of 60.5° C., after removal of the hydrogen chloride formed, thereby indicating its composition to be substantially pure monochloroacetic acid.

Example VI

A 92.0% yield of monochloroacetic acid having a crystallizing point of 61.2° C. after hydrolysis and removal of hydrogen chloride was obtained by chlorinating, in accordance with the method described in Example IV, a mixture comprised of 35% acetic anhydride and 65% glacial acetic acid, containing 200 g. of acetic anhydride and 370 g. of glacial acetic acid.

Example VII

In accordance with the procedure described in Example IV, a 40% acetic anhydride-60% glacial acetic acid mixture containing 228 g. of acetic anhydride and 342 g. of acetic acid, was chlorinated to yield a reaction product weighing 874 g. and having a crystallizing point of 60.7° C. after hydrolysis and removal of the hydrogen chloride.

Example VIII

A 92.8% yield of monochloroacetic acid having a crystallizing point of 60.6° C. after hydrolysis and removal of hydrogen chloride was obtained by chlorinating, in accordance with the method described in Example IV, a mixture containing 256 g. of acetic anhydride and 314 g. of acetic acid, representing a mixture comprised of 45% acetic anhydride and 55% glacial acetic acid.

Example IX

A mixture comprised of equal proportions of acetic anhydride and glacial acetic acid, 285 g. of glacial acetic acid and 285 g. of acetic anhydride, was chlorinated with gaseous chlorine, in accordance with the method described in Example IV, to yield a reaction product weighing 887 g. and having a crystallizing point of 60.5° C. after hydrolysis of the chloroacetyl chloride and the chloroacetic anhydride contained therein, to monochloroacetic acid and removal of the hydrogen chloride formed during the hydrolysis.

Example X

A mixture containing 398 g. of acetic anhydride and 172 g. of glacial acetic acid was chlorinated in accordance with the procedure set forth in Example IV, thereby obtaining a reaction product weighing 912 g., representing a yield of 90.2%, and having a crystallizing point of 60.0° C. after hydrolysis and removal of hydrogen chloride.

Example XI

A reaction product consisting of substantially pure monochloroacetic acid and having a crystallizing point of 59.5° C. after hydrolysis and removal of hydrogen chloride, was obtained by chlorinating a mixture containing 456 g. of acetic anhydride and 114 g. of glacial acetic acid, in accordance with the procedure described in Example IV.

Example XII

A mixture containing 485 g. of acetic anhydride and 85 g. of glacial acetic acid was chlorinated, in accordance with the procedure set forth in Example IV. The mixture chlorinated was comprised of 85% acetic anhydride and 15% glacial acetic acid. A reaction product weighing 900 g. was obtained, having a crystallizing point of 59.2° C. after hydrolysis and removal of hydrogen chloride.

Example XIII

In accordance with the procedure set forth in Example IV, a mixture comprised of 95% acetic anhydride and 5% glacial acetic acid, 542 g. of acetic anhydride and 28 g. of glacial acetic acid, was chlorinated. A reaction product weighing 950 g. was obtained. This reaction product, however, contained considerable quantities of undesirable impurities, as evidenced by the fact that the crystallizing point of the reaction product could not be raised higher than 57.0° C. by hydrolysis of the impurities contained therein and removal of hydrogen chloride. The reaction product, therefore, was not of utility, per se, but had to be purified by static crystallization in order to separate monochloroacetic acid from the impurities contained therein in order to obtain a monochloroacetic acid fraction having a crystallizing point in excess of 59° C.

Example XIV

Chlorination of 100% acetic anhydride, in accordance with the procedure set forth in Example IV, was attempted. After 30% of the required quantity of chlorine was added to the acetic anhydride, chlorination was stopped as chlorine absorption had dropped so significantly that practically none was being absorbed. The small amount of monochloroacetic formed in the chlorinated reaction product had to be isolated by fractionation and crystallization. The reaction mixture, per se, had no utility.

Example XV 378 g. of the reaction product, prior to hydrolysis, obtained in Example IV, were dissolved in 466 ml. of water contained in a suitable glass vessel equipped with vigorous agitation. A 30% aqueous solution of sodium hydroxide was added in sufficient quantity to neutralize the chloroacetic acid. During neutralization, the temperature was maintained at 35–40° C.

After neutralization, 4 g. mols of coarsely milled sodium cyanide were slowly added to the sodium chloroacetate solution, maintaining a reaction temperature of 50–60° C. during cyanification.

The sodium cyanoacetate solution was then cooled to 35–40° C. and 2.1 g. mols of 60° Bé. sulfuric acid slowly added.

The acidified solution of cyanoacetic acid was then dehydrated under vacuum until a maximum batch temperature of 65° C. at 20 mm. Hg. absolute pressure was obtained. The thick acid-salt slurry was then filtered to remove the salts, thereby obtaining in excellent yield and purity cyanoacetic acid.

The degree of purity of the cyanoacetic acid thus obtained was equivalent to that degree of purity of cyanoacetic acid that would have been obtained if monochloroacetic acid, having a crystallizing point in excess of about 59° C., had been utilized in the process in place of the reaction product previously described.

*Example XVI*

69.6 g. (0.4 mol) of 2,4-dichlorophenol, 71.2 g. (0.8 mol) of 45.0% sodium hydroxide and 56 g. of water were charged to a suitable reactor. With continuous stirring and while maintaining a temperature below 35° C., 37.8 g. of the reaction product prior to hydrolysis, obtained in Example V, was added in a molten state over a period of 5 minutes. The reaction mixture was then heated to 95° C. and held at 95-100° C. for 2 hours with continuous agitation while adding 10 g. of a 45% sodium hydroxide solution. After the reaction was complete, the excess alkali was neutralized, excess phenol removed by steam distillation and the 2,4-dichlorophenoxyacetic acid isolated by methods well known to those skilled in the art.

The degree of purity and yield of 2,4-dichlorophenoxyacetic acid obtained according to the procedure described above, was comparable to that obtained using monochloroacetic acid having a crystallizing point in excess of about 59° C. in place of the reaction product previously described.

What is claimed is:

1. In a process for the production of monochloroacetic acid, the step comprising chlorinating a mixture containing about 15% to 75% glacial acetic acid and about 85% to 25% acetic anhydride at a temperature in the range of from about 70° C. to about 110° C. to form a reaction mixture containing predominantly monochloroacetic acid, and thereafter adding water to the reaction mixture until the crystallizing point of the reaction mixture is in the range of from about 59° C. to the crystallizing point of substantially pure monochloroacetic acid (alpha modification) after removal of the hydrogen chloride formed.

2. In a process for the production of monochloroacetic acid, the step comprising chlorinating a mixture containing about 15% to 75% glacial acetic acid and about 85% to 25% acetic anhydride to approximately the monochloro stage, while maintaining a temperature in the range of from about 70° C. to about 110° C. to form a reaction mixture containing predominantly monochloroacetic acid, and thereafter adding water to the reaction mixture until the crystallizing point of the reaction mixture is in the range of from about 59° C. to the crystallizing point of substantially pure monochloroacetic acid (alpha modification) after removal of the hydrogen chloride formed.

3. In a process for the production of monochloroacetic acid, the step comprising reacting approximately a 1 molecular proportion of chlorine with a 1 molecular proportion, calculated as acetic acid, of a mixture containing about 15% to 75% glacial acetic acid, and about 85% to about 25% acetic anhydride, while maintaining a temperature in the range of from about 70° C. to about 110° C. to form a reaction mixture containing predominantly monochloroacetic acid, and thereafter adding water to the reaction mixture until the crystallizing point of the reaction mixture is in the range of from about 59° C. to the crystallizing point of substantially pure monochloroacetic acid (alpha modification) after removal of the hydrogen chloride formed.

4. In a process for the preparation of commercially pure monochloroacetic acid, the step comprising adding to the reaction product obtained by chlorinating a mixture containing about 15% to 75% glacial acetic acid and about 85% to 25% acetic anhydride to approximately the monochloro stage while maintaining a temperature in the range of from about 70° C. to about 110° C., a quantity of water at least sufficient to raise the crystallizing point of said reaction product to a temperature in the range of from about 59° C. to about the crystallizing point of substantially pure monochloroacetic acid (alpha modification) after removal of the hydrogen chloride formed.

5. In a process for the preparation of commercially pure monochloroacetic acid and compounds prepared therefrom, the step comprising contacting the reaction product obtained by chlorinating a mixture containing about 15% to 75% glacial acetic acid and about 85% to 25% acetic anhydride to approximately the monochloro stage while maintaining a temperature in the range of from about 70° C. to about 110° C., with a quantity of water at least sufficient to hydrolyze any chloroacetic chloride and chloroacetic anhydride present in said reaction product.

6. In a process for the preparation of commercially pure monochloroacetic acid and compounds derived from monochloroacetic acid, the step comprising reacting the reaction mixture obtained by chlorinating a mixture containing about 15% to 75% glacial acetic acid and about 85% to 25% acetic anhydride to approximately the monochloro stage, while maintaining during said chlorination a temperature in the range of from about 70° C. to about 110° C., under such conditions that any chloroacetyl chloride and chloroacetic anhydride contained in said reaction mixture are converted to the same compound as is the monochloroacetic acid also contained in said reaction mixture.

CHARLES M. EAKER.

REFERENCES CITED

The following references are of record in the file of this patent:

FOREIGN PATENTS

| Number | Country | Date |
|---|---|---|
| 638,117 | Germany | Nov. 10, 1936 |